(12) United States Patent
Boocock

(10) Patent No.: US 8,192,541 B2
(45) Date of Patent: Jun. 5, 2012

(54) SUBSTITUTED TIN NIOBIUM PYROCHLORE AND TIN NIOBIUM OXIDE PIGMENTS

(75) Inventor: Simon Boocock, Liberty Township, OH (US)

(73) Assignee: The Shepherd Color Company, Cincinnati, OH (US)

( * ) Notice: Subject to any disclaimer, the term of this patent is extended or adjusted under 35 U.S.C. 154(b) by 0 days.

(21) Appl. No.: 13/154,777

(22) Filed: Jun. 7, 2011

(65) Prior Publication Data

US 2011/0297045 A1  Dec. 8, 2011

Related U.S. Application Data

(60) Provisional application No. 61/352,497, filed on Jun. 8, 2010.

(51) Int. Cl.
  *C09C 1/04* (2006.01)
  *C09C 1/02* (2006.01)
  *C09C 1/22* (2006.01)
  *C04B 14/00* (2006.01)

(52) U.S. Cl. ........ 106/419; 106/420; 106/459; 106/461; 106/480

(58) Field of Classification Search .................. 106/420, 106/459, 461, 480, 419
See application file for complete search history.

(56) References Cited

U.S. PATENT DOCUMENTS 6,830,822 B2 * 12/2004 Yadav ............................ 428/552
7,387,673 B2 *  6/2008 Yadav et al. ................... 106/499
7,594,961 B2    9/2009 Booth et al.

OTHER PUBLICATIONS

Cruz, L., et al., "Synthesis and Characterization of Tin Niobates," Journal of Solid State Chemistry, vol. 156(2) (Feb. 1, 2001) pp. 349-354.
International Search Report and Written Opinion dated Aug. 19, 2011 for Application PCT/US2011/039432.

* cited by examiner

*Primary Examiner* — Anthony J Green
(74) *Attorney, Agent, or Firm* — Frost Brown Todd LLC

(57) ABSTRACT

An inorganic pigment comprising tin; a divalent metal; niobium; and an oxysulfide, an oxyselenide, or oxysulfo-selenide.

17 Claims, 5 Drawing Sheets

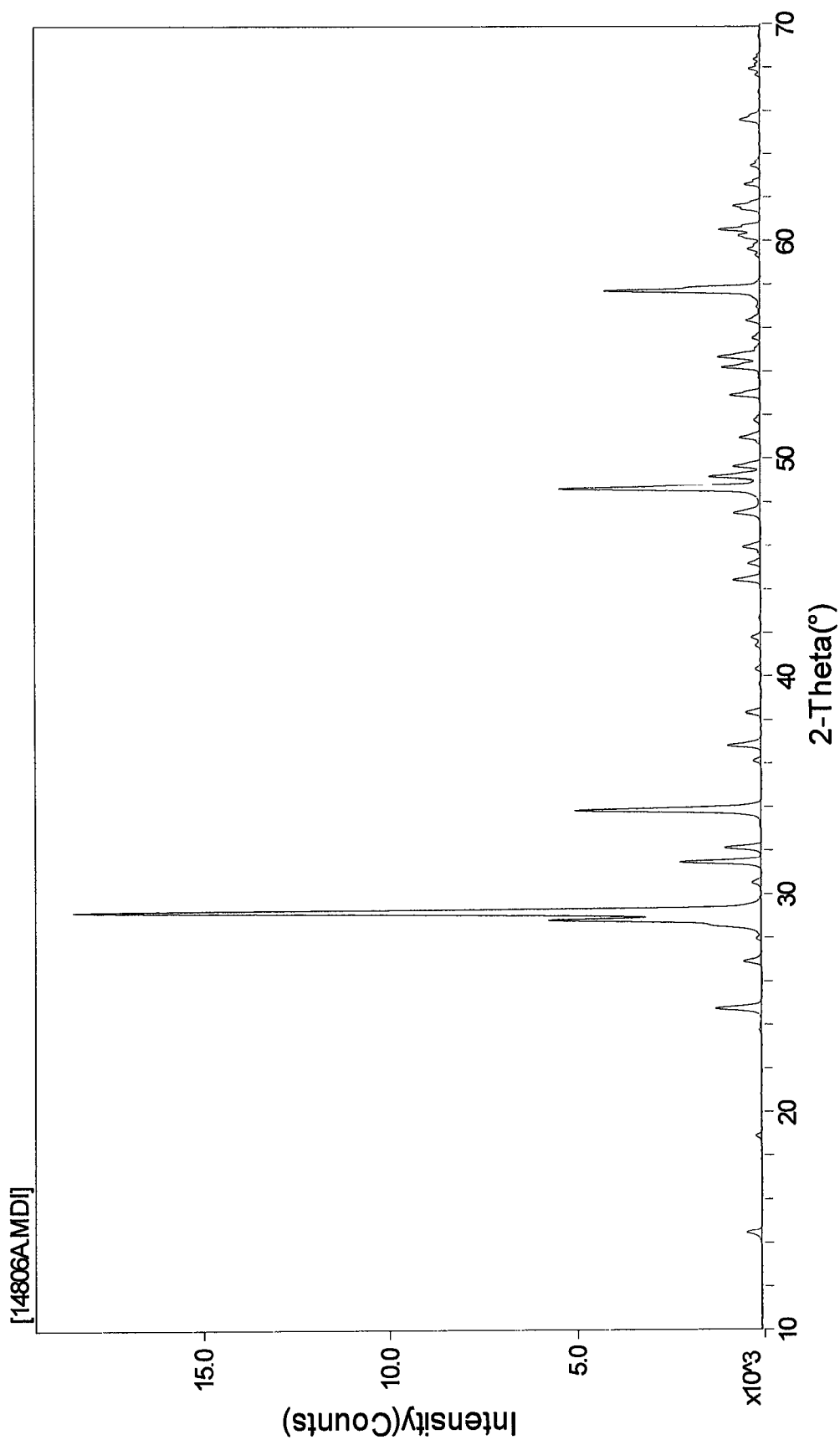
Figure 3: Example 2

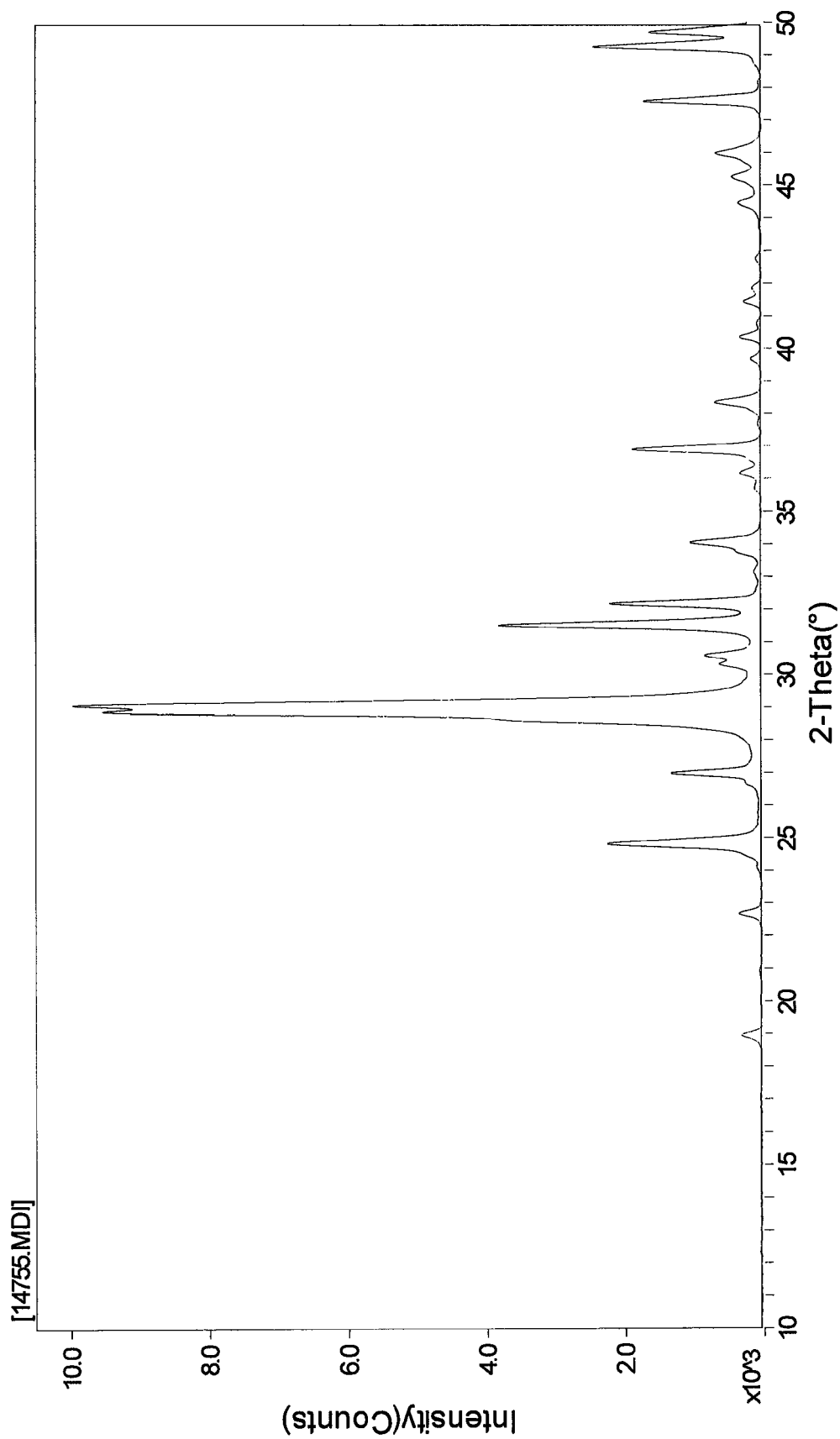
Figure 4: Example 4

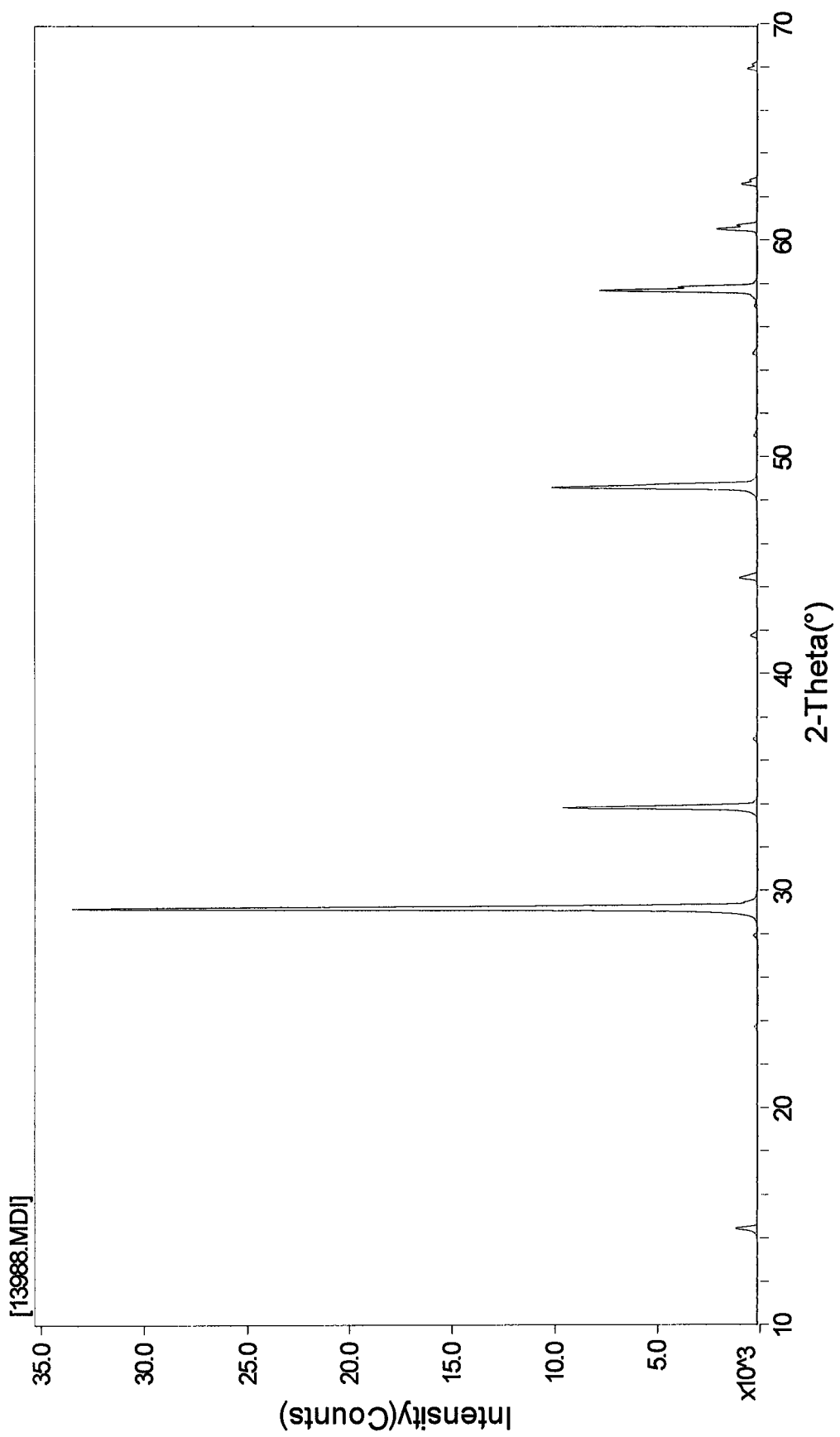
Figure 5: Example 11

SUBSTITUTED TIN NIOBIUM PYROCHLORE AND TIN NIOBIUM OXIDE PIGMENTS

CROSS REFERENCE TO RELATED APPLICATIONS

The present application hereby claims the benefit of the provisional patent application Ser. No. 61/352,497, filed on Jun. 8, 2010, the disclosure of which is hereby incorporated by reference in its entirety.

BACKGROUND

High temperature stable yellow and yellow-orange pigments are highly valued. Pigments with high chromaticity and temperature stability possessing required color characteristics have traditionally been made from cadmium sulfide, cadmium sulfo-selenide or zinc substituted cadmium sulfo-selenides.

Because of regulatory concerns the use of these cadmium containing pigments described above has been increasingly constrained in commerce. Thus, there is a need for substitutes that meet the color characteristics of CdS or CdS—Se pigments without depending on cadmium.

Tin niobium pyrochlore is formally $Sn_2Nb_2O_7$. The use of this general class of compound as a pigment or colorant to replace cadmium sulfide or sulfo-selenide pigments is proposed and disclosed in U.S. Pat. No. 7,594,961.

The disclosure in the above referenced patent contemplates making the pure pyrochlore, $Sn_2Nb_2O_7$. Additionally, the referenced application posits pigments in which tin sulfide is used in lieu of stannous oxide in the synthesis of the finished pigment. Finally, the referenced patent posits substitution of the pentavalent niobium atoms with other transition metals that can exhibit a high valence state, such as tungsten or molybdenum in the form of $MoO_3$ or $WO_3$. These substitutions are intended to modify the color of the pigments produced.

All syntheses described in the above referenced patent were either conducted in a sealed tube, or performed under controlled atmosphere conditions. Despite such care, acid-washing step of the initial product is required to yield a clean, vibrant pigment. This acid washing removes either unreacted stannous oxide or metallic tin.

SUMMARY

An inorganic pigment comprising tin; a divalent metal; niobium; and an oxysulfide, an oxyselenide, or oxysulfo-selenide

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

FIG. 3 is a powder x-ray diffraction pattern for example 2.
FIG. 4 is a powder x-ray diffraction pattern for example 4.
FIG. 5 is a powder x-ray diffraction pattern for example 11.

DETAILED DESCRIPTION

Figure 1:
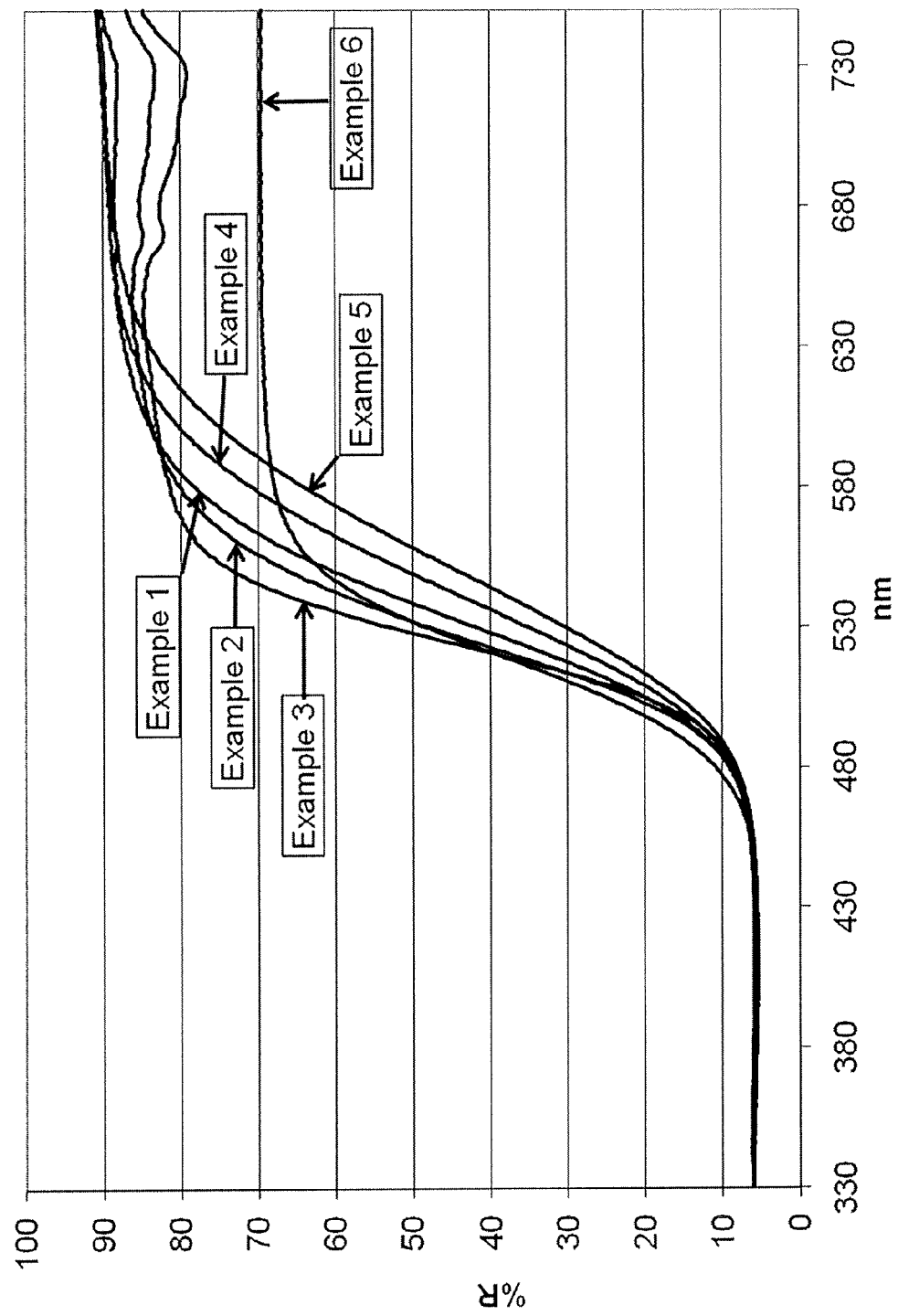
FIG. 1 is a UV-visible spectrum for examples 1-6 when the pigments are printed on Leneta cards out of an acrylic paint vehicle.
Figure 2:
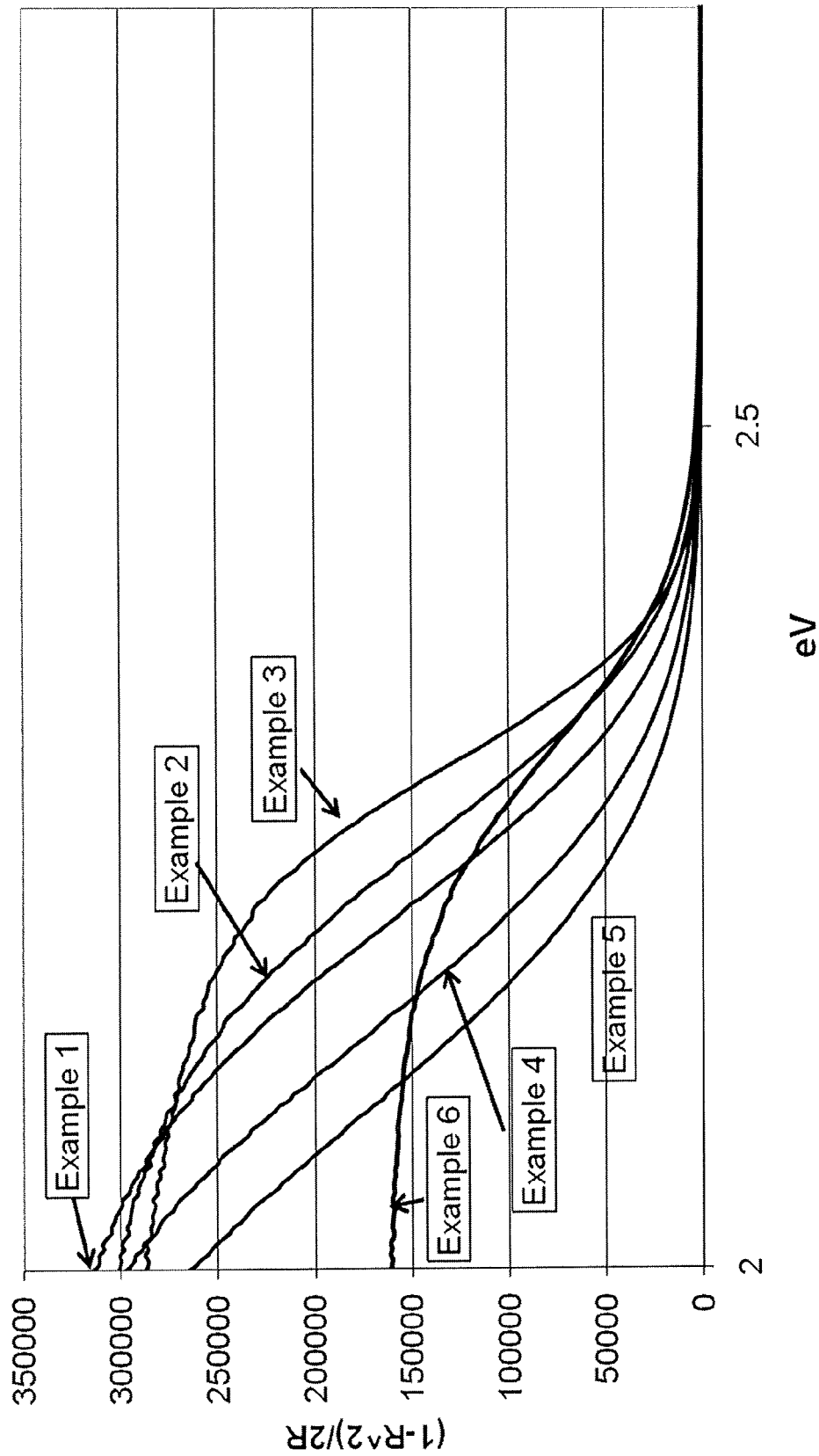
FIG. 2 is a Kubelka Remission plot for examples 1-6 when the pigments are printed on Leneta cards out of an acrylic paint vehicle.

Inorganic pigments based on tin niobium niobium oxide may be substituted at the location of the tin atom in the lattice to adjust color or improve ease of synthesis.

Stannous oxide, on thermal decomposition will yield tin metal (along with an equimolar proportion of stannic oxide). The temperature at which such decomposition occurs under an inert atmosphere is known to be as low as 300° C. when stannous oxide is heated independent of other components. When stannous oxide is calcined with other oxides with the aim of obtaining a new mixed-metal oxide, such as tin niobium pyrochlore, $SnNb_2O_7$, a competition is set up between the desired solid-state ionic diffusion to yield the pyrochlore lattice and undesirable decomposition of the stannous oxide—yielding tin metal and stannous oxide. Given the long recognized instability of stannous oxide at temperatures well below those demanded to synthesize mixed-metal oxide phases, the step of acid washing (described in U.S. Pat. No. 7,594,961) to remove such a contaminant is to be expected. Such decomposition damages the quality of a yielded color in three ways. First, the tin metal, if not completely removed will make the yielded pigment appear very dirty and muddy, unchromatic. Second, that the pigment requires acid washing is commercially undesirable as it adds cost to the processing of the pigment, while reducing overall mass yield. Third, the pigment will likely be diluted in masstone as it will contain traces of stannous oxide—which is, at best, a tinting agent.

Substitution at the divalent metal center in $Sn_2Nb_2O_7$ pyrochlore can improve color of the derived pigment, control onset of absorbance in a manner expected for a band-gap colorant, reduce the firing temperature demanded to complete synthesis, and eliminate the requirement to conduct acid washing of the calcined product to rid it of contaminants such as metallic tin.

While others have made pigments similar to $Sn_2Nb_2O_7$ (U.S. Pat. No. 7,594,961), they have not made substitutions on the divalent site of the pyrochlore structure. Additionally, their method of making the pigment does not address the impact on color of the presence of Sn(IV) in the lattice.

In one embodiment the inorganic pigment comprises tin; a divalent metal; niobium; and an oxysulfide, an oxyselenide, or oxysulfo-selenide.

In one embodiment the pigments has the empirical formula: $M_2Nb_2Z_7 \cdot XMNb_2Z_6$ where M comprises tin and a divalent metal; Z comprises oxygen and either sulfur, selenium, or a mixture of sulfur and selenium; and X ranges from 0 to 100. In one embodiment, X may be from about 0 to about 0.15; about 0 to about 0.25; about 0.25 to about 0.5; about 0.5 to about 1.0; about 1.0 to about 10; about 10 to about 50; or about 50 to about 100. In the empirical formula $M_2Nb_2Z_7 \cdot XMNb_2Z_6$, X is a coefficient. When X is 50 the empirical formula is $M_2Nb_2Z_7 \cdot 50MNb_2Z_6$. When X is 0.1 the empirical formula is $M_2Nb_2Z_7 \cdot 0.1MNb_2Z_6$, which is equivalent to $10M_2Nb_2Z_7 \cdot MNb_2Z_6$.

Divalent metals are those where the common oxidation state or more stable oxidation state is +2, such as zinc, tin, cobalt, manganese, iron, calcium, and magnesium. Metals with common oxidation states or stable oxidation states that are not +2 are not divalent metals, such as tungsten and molybdenum.

In one embodiment the divalent metal comprises zinc. The ratio of tin to zinc may range from about 10 to 1; to about 1 to 10. In one embodiment the ratio of tin to zinc is about 4 to 1; about 3 to 1; about 2 to 1; about 1 to 1; about 1 to 2; about 1 to 3; or about 1 to 4.

Increasing the proportion of divalent metal substituent employed, in lieu of a molar equivalent of stannous oxide, tends to shift the color in a uniform fashion from an orange to a more yellow tone. In one embodiment, divalent metals include alkali earth metals, or transition metals.

In one embodiment tin oxide may be partially replaced with zinc sulfide or zinc selenide. This substitution may lower the synthesis temperature by at least 100° C. from around 1000° C. to about 850° C. This also frees the pigment from the requirement that it be cleaned of unreacted stannous oxide or metallic tin by acid extraction.

In one embodiment, the pigment may be substituted by metals other than zinc at the divalent "A" site in this $A_2B_2O_7$ pyrochlore, or $AB_2O_6$ foordite structure. This may be accomplished with or without zinc sulfide to lower the onset of reaction.

Pigments with higher ratios of selenium compared to sulfur tend to have colors that are shifted from a more yellow to a more orange tone.

Compounds with low values of X have the structure of a pyrochlore compound. At higher values of X, greater than about 1, the dominant structure adopted may become that of foordite, $SnNb_2O_6$. In one embodiment X is 0, so the empirical formula for the pigment is $M_2Nb_2Z_7$. In another embodiment X is 0, M comprises tin and zinc, and Z comprises sulfur and oxygen so that the ZnS:SnO ratio is between 0.04:1.96 and 0.20:1.80.

In one embodiment the pigment has the empirical formula: $MNb_2Z_6$, where M comprises tin and a divalent metal; and Z comprises oxygen and either sulfur, selenium, or a mixture of sulfur and selenium. In another embodiment the pigment has the empirical formula: $MNb_2Z_6$, where M comprises tin and zinc; and Z comprises oxygen and either sulfur, selenium, or a mixture of sulfur and selenium The inorganic pigments may be synthesized by creating a mixture of metal oxides and intensively blending them in a mixer. The mixture is heated under an inert gas from about 850° C. to about 1000° C.

The color of the pigment may be measured as an acrylic masstone using the procedure described in Example 10. In one embodiment the color of the acrylic masstone of the pigment has an L* of about 73.7 to about 82.8, an a* of about 4.9 to about 21.1, and a b* of about 72 to about 84.7. In another embodiment the acrylic masstone of the pigment has an L* of about 77.1 to about 78.4, an a* of about 8.0 to about 16.5, and a b* of about 76.6 to about 79.5. In another embodiment the acrylic masstone of the pigment has an L* of about 77.1 to about 78, an a* of about 8.0 to about 16.5, and a b* of about 76.6 to about 78.8.

The crystal structure of the inorganic pigment has an effect upon the color produced by the pigment. In one embodiment the inorganic pigment is characterized by an X-ray powder diffraction pattern comprising d-spacings of about 3.095 Å, 3.056 Å, 2.841 Å, 2.645 Å, 1.871 Å, 1.677 Å, and 1.596 Å. In another embodiment the inorganic pigment is characterized by an X-ray powder diffraction pattern comprising d-spacings of about 3.584 Å, 3.066 Å, 2.836 Å, 2.779 Å, 2.434 Å, and 1.910 Å. In another embodiment the inorganic pigment is characterized by an X-ray powder diffraction pattern comprising d-spacings of about 3.056 Å, 2.647 Å, 1.872 Å, and 1.596 Å.

In one embodiment, the process of making the pigments does not require an acid wash to remove contaminants of stannous oxide decomposition.

The inorganic pigments may be used in many applications such as coatings, or colored plastics such as vinyl siding. A desirable property in these applications is the high IR reflection exhibited by the pigments. This property allows the pigments to develop the desired color in the visible range, while reflecting a large amount of the IR radiation outside of this visible range. This means that the surface of objects colored with the present IR reflective pigments remain cooler under solar radiation than those not colored with IR reflective pigments. The reflectance properties of the inorganic pigments may be higher at IR wavelengths (greater than 700 nm) compared to visible wavelengths (400-700 nm). Infrared reflectance may be measured on the compressed dry powder inorganic pigment using an integrating sphere instrument in accordance with ASTM E903-96. In one embodiment the IR reflectance is greater than about 50%, 60%, 70%, or 80% on average throughout the region from 700 nm to 2500 nm.

Example 1

An intimate mixture of stannous oxide, niobium oxide and zinc sulfide is made using an intensive blending mixer in molar ratios 1.5, 1, 0.5. The raw batch so produced is loaded into open top alumina boats and fired under flowing inert gas (either nitrogen or argon) at or around 850° C., 1565° F. The resulting product is a uniform yellow colored powder with an orange tone.

Example 2

An intimate mixture of stannous oxide, niobium oxide, and zinc sulfide is made using an intensive blending mixer in molar ratios 1.3, 1, 0.7. The raw batch so produced is loaded into open top alumina boats and fired under flowing inert gas (either nitrogen or argon) at or around 850° C., 1565° F. The resulting product is a uniform yellow colored powder with a slight orange tone.

Example 3

An intimate mixture of stannous oxide, niobium oxide, and zinc sulfide is made using an intensive blending mixer in molar ratios 1.0, 1, 1.0. The raw batch so produced is loaded into open top alumina boats and fired under flowing inert gas (either nitrogen or argon) at or around 850° C., 1565° F. The resulting product is a uniform yellow colored powder.

Example 4

An intimate mixture of stannous oxide, niobium oxide, zinc sulfide, and zinc selenide is made using an intensive blending mixer in molar ratios 0.375, 0.25, 0.0765, 0.0485. The raw batch so produced is loaded into open top alumina boats and fired under flowing inert gas (either nitrogen or argon) at or around 850° C., 1565° F. The resulting product is a uniform yellow colored powder with an orange tone.

Example 5

An intimate mixture of stannous oxide, niobium oxide and zinc selenide is made using an intensive blending mixer in molar ratios 0.375, 0.25, 0.125. The raw batch so produced is loaded into open top alumina boats and fired under flowing inert gas (either nitrogen or argon) at or around 850° C., 1565° F. The resulting product is a uniform yellow colored powder with a marked orange tone.

Example 6

An intimate mixture of stannous oxide and niobium oxide is made using an intensive blending mixer in molar ratios 0.5, 0.25. The raw batch so produced is loaded into open top alumina boats and fired under flowing inert gas (either nitrogen or argon) at or around 850° C., 1565° F. The resulting product is a very green-shade yellow colored powder indicative of incomplete reaction.

Example 7

An intimate mixture of stannous oxide and niobium oxide is made using an intensive blending mixer in molar ratios 0.5, 0.25. The raw batch so produced is loaded into open top alumina boats and fired under flowing inert gas (either nitrogen or argon) at or around 1050° C., 1925° F. The resulting product is a uniform yellow colored powder.

Example 8

An intimate mixture of stannous oxide, niobium oxide, zinc sulfide, and manganese carbonate is made in molar ratios of 0.465, 0.25, 0.015, 0.02. The raw batch is calcined as in Example 1 to yield an orange toned yellow powder.

Example 9

An intimate mixture of stannous oxide, niobium oxide, zinc sulfide, and cobalt carbonate is made in molar ratios of 0.465, 0.25, 0.015, 0.02. The raw batch is calcined as in Example 1 to yield a yellow powder more green in tone than Example 8.

Example 10

The products from Examples 1 through 5 and Example 7 are finely ground and introduced into an acrylic paint vehicle. The resulting color in masstone, and in reduction (4:1) with $TiO_2$ is shown below. Masstone samples were produced by introducing 21.9 g of pigment into 39.6 grams of a clear modified acrylic resin solution (46.6 resin weight percent). Tint samples were created by cross-blending at appropriate ratios 1 part of the colored enamel, made as above, with 4 parts of a similarly created white acrylic paint wherein all the pigment was titanium dioxide. Color cards were prepared by drawing down the enamels using a 10-mil Bird gage, allowing them to air dry for 30 minutes, then finish drying at 125° F. for 45 minutes. Color data is reported below in the CIELAB color space, (D65 illuminant) using 2-degree observer, made on an integrating sphere MacBeth Color-Eye 7000 instrument with, specular reflectance included.

As ZnS loading is increased from Example 6 through Example 3 the yellowness of the product improves and redness (a*) diminishes. As selenium loading increases from example 3 to 4 then 5 the redness of the sample increases, while yellow tone (b*) diminishes. This trend is also observable in the onset of the UV-Visible Spectra for the same examples when the pigments are printed on Leneta cards out of an acrylic paint vehicle.

Example 11

An intimate mixture of stannous oxide, niobium oxide, and zinc sulfide is made using an intensive blending mixer in molar ratios 1.9, 1, 0.1. The raw batch produced is loaded into open top alumina boats and fired under flowing inert gas (either nitrogen or argon) at or between 850° C., 1565° F. and 1000° C., 1832° F. The resulting product is a uniform yellow colored powder with a strong orange tone.

Example 12

Several intimate mixtures of stannous oxide, niobium oxide, and zinc sulfide are made using an intensive blending mixer across increasing molar ratios of ZnS:SnO. Molar ratios of ZnS:SnO were from 0.04:1.96 to 0.30:1.70. Ratios of these components to niobium oxide were stoichiometric for an $A_2B_2X_7$ pyrochlore. The raw batches were calcined in the manner previously described. The resulting products are entirely free of tin impurities, as determined by TGA-DSC and either tin metal or stannous oxide impurities as determined by x-ray powder diffraction. The products of this example exhibit a single pyrochlore phase in their x-ray powder diffraction pattern for ratios of ZnS:SnO between 0.04:1.96 and 0.20:1.80. The sub-set of such products exhibit uniform shifts in observed color coordinates commensurate with increasing ZnS doping into the pyrochlore lattice showing increased red hue and improvements in yellow masstone. At molar ratios of ZnS:SnO of 0.25:1.75 and above the red hue no longer improves, while yellow tone continues to develop strength. This sub-set of products exhibits traces of Masstone Data

| Sample | L* | a* | b* | C* | h° | Firing Temperature | {ZnS + ZnSe} |
|---|---|---|---|---|---|---|---|
| Example 6 | 78.29 | 0.69 | 75.21 | 75.22 | 89.48 | 850° C. | 0 |
| Example 1 | 79.89 | 13.04 | 80.58 | 81.63 | 80.81 | 850° C. | 0.25 |
| Example 2 | 81.6 | 8.44 | 82.44 | 82.87 | 84.15 | 850° C. | 0.33 |
| Example 3 | 82.82 | 4.9 | 84.69 | 84.83 | 86.69 | 850° C. | 0.5 |
| Example 4 | 76.67 | 18.11 | 75.93 | 78.06 | 76.58 | 850° C. | 0.25 |
| Example 5 | 73.68 | 21.14 | 72 | 75.04 | 73.64 | 850° C. | 0.25 |
| Example 7 | 79.34 | 9.52 | 81.85 | 82.4 | 83.37 | 1050° C. | 0 |

Tint Data

| Sample | L* | a* | b* | C* | h° | Firing Temperature | {ZnS + ZnSe} |
|---|---|---|---|---|---|---|---|
| Example 6 | 88.68 | −3.69 | 42.75 | 42.91 | 94.94 | 850° C. | 0 |
| Example 1 | 89.68 | 1.97 | 44.62 | 44.67 | 87.48 | 850° C. | 0.25 |
| Example 2 | 90.85 | −0.74 | 45.32 | 45.33 | 90.94 | 850° C. | 0.33 |
| Example 3 | 92.7 | −1.97 | 36.68 | 36.73 | 93.08 | 850° C. | 0.5 |
| Example 4 | 88.44 | 4.81 | 40.68 | 40.96 | 83.25 | 850° C. | 0.25 |
| Example 5 | 86.88 | 6.82 | 37.18 | 37.8 | 79.6 | 850° C. | 0.25 |
| Example 7 | 91.72 | 0.67 | 30.93 | 30.94 | 88.76 | 1050° C. | 0 | foordite along with pyrochlore (as the dominant phase) in their x-ray powder diffraction patterns.

Acrylic Masstone Data Example 12

| Sample | L* | a* | b* | Mole Ratio Zn:Sn |
|---|---|---|---|---|
| a | 77.16 | 8.01 | 76.57 | 0.04:1.96 |
| b | 77.11 | 11.4 | 77.13 | 0.06:1.94 |
| c | 77.73 | 14.35 | 78.43 | 0.08:1.92 |
| d | 77.63 | 15.89 | 78.56 | 0.1:1.90 |
| e | 77.75 | 16.53 | 78.78 | 0.15:1.85 |
| f | 77.95 | 16.41 | 78.68 | 0.20:1.80 |
| g | 78.39 | 15.58 | 79.36 | 0.25:1.75 |
| h | 78.42 | 15.4 | 79.45 | 0.30:1.70 |

Acrylic Tint Data Example 12

| Sample | L* | a* | b* | Mole Ratio Zn:Sn |
|---|---|---|---|---|
| a | 89.07 | −0.12 | 38.84 | 0.04:1.96 |
| b | 89.06 | 1.55 | 38.99 | 0.06:1.94 |
| c | 89.33 | 2.96 | 38.88 | 0.08:1.92 |
| d | 89.31 | 3.63 | 38.43 | 0.1:1.90 |
| e | 89.15 | 4.11 | 38.71 | 0.15:1.85 |
| f | 89.06 | 4.23 | 39.29 | 0.20:1.80 |
| g | 89.48 | 3.47 | 38.94 | 0.25:1.75 |
| h | 89.58 | 3.2 | 39.1 | 0.30:1.70 |

The invention claimed is:

1. An inorganic pigment comprising tin; a divalent metal; niobium; and an oxysulfide, an oxyselenide, or oxysulfoselenide; wherein the pigment has the empirical formula:

$$M_2Nb_2Z_7 \cdot XMNb_2Z_6$$

where M comprises tin and a divalent metal; Z comprises oxygen and either sulfur, selenium, or a mixture of sulfur and selenium; and X ranges from 0 to 100.

2. The pigment of claim 1, wherein M comprises Sn and Zn.

3. The pigment of claim 2, wherein X is 0.

4. The pigment of claim 2, wherein X is 0 and Z comprises sulfur and oxygen so that the ZnS:SnO ratio is between 0.04:1.96 and 0.20:1.80.

5. The pigment of claim 1, wherein M additionally comprises at least one alkali earth metal.

6. The pigment of claim 1, wherein M additionally comprises at least one transition metal.

7. The pigment of claim 1, wherein the pigment has a pyrochlore structure.

8. The pigment of claim 1, wherein the pigment has a foordite structure.

9. The pigment of claim 1 with the empirical formula:

$$MNb_2Z_6$$

where M comprises tin and a divalent metal; and Z comprises oxygen and either sulfur, selenium, or a mixture of sulfur and selenium.

10. The pigment of claim 9, wherein M comprises Sn and Zn.

11. The pigment of claim 1, wherein the color of an acrylic masstone of the pigment has an L* of about 73.7 to about 82.8, an a* of about 4.9 to about 21.1, and a b* of about 72 to about 84.7.

12. The pigment of claim 1, wherein the color of an acrylic masstone of the pigment has an L* of about 77.1 to about 78.4, an a* of about 8.0 to about 16.5, and a b* of about 76.6 to about 79.5.

13. The pigment of claim 1, wherein the color of an acrylic masstone of the pigment has an L* of about 77.1 to about 78, an a* of about 8.0 to about 16.5, and a b* of about 76.6 to about 78.8.

14. The pigment of claim 1, characterized by an X-ray powder diffraction pattern comprising d-spacings of about 3.095 Å, 3.056 Å, 2.841 Å, 2.645 Å, 1.871 Å, 1.677 Å, and 1.596 Å.

15. The pigment of claim 1, characterized by an X-ray powder diffraction pattern comprising d-spacings of about 3.584 Å, 3.066 Å, 2.836 Å, 2.779 Å, 2.434 Å, and 1.910 Å.

16. The pigment of claim 1, characterized by an X-ray powder diffraction pattern comprising d-spacings of about 3.056 Å, 2.647 Å, 1.872 Å, and 1.596 Å.

17. The pigment of claim 1, having an infrared reflectance, as measured on compressed dry powders using an integrating sphere instrument, in accordance with ASTM E903-96, of greater than 70% on average throughout the region from 700 nm to 2500 nm.

* * * * *